United States Patent [19]

Liu

[11] Patent Number: 5,259,245
[45] Date of Patent: Nov. 9, 1993

[54] FLUID LEVEL MEASURING DEVICE WITH ARMLESS FLOAT

[76] Inventor: Paul Liu, Room 1004, No. 600, Ming Chuan E. Road, Taipei, Taiwan

[21] Appl. No.: 981,498

[22] Filed: Nov. 25, 1992

[51] Int. Cl.⁵ .......................................... G01F 23/60
[52] U.S. Cl. ...................................................... 73/319
[58] Field of Search .................... 73/319, 322, 313; 338/32, 33, 295

[56] References Cited

U.S. PATENT DOCUMENTS

| | | | |
|---|---|---|---|
| 4,702,107 | 10/1987 | Guerrini et al. | 73/319 |
| 4,813,282 | 3/1989 | Maggia | 73/319 |
| 4,920,798 | 5/1990 | Weaver | 73/319 X |
| 4,976,146 | 12/1990 | Senghaas | 73/313 X |
| 5,020,366 | 6/1991 | Elfverson et al. | 338/33 X |
| 5,146,785 | 9/1992 | Riley | 338/33 X |

*Primary Examiner*—Daniel M. Yasich
*Attorney, Agent, or Firm*—Browdy and Neimark

[57] ABSTRACT

A fluid level measuring device with an armless float adapted for an irregularly shaped gas tank of a vehicle is equipped with an elongaged mounting pole which extends to the bottom of a gas tank at one end and is fixed to the top of the tank at the other. The mounting pole is provided with a receiving groove at the front side thereof into which a PC board is and a float is slidably moved up along the mounting pole due to the buoyancy of the fluid in the tank and down due to its own weight. A metallic contact member attached to the float and one of its copper points is slidably mounted in abutment against one elongated conductive circuit path of the PC board so as to constantly form a closed circuit via bridged resistors and the elongated conductive circuit path and the grounded mounting pole. As a result of the positional variation of the float in correspondence to the level of the fluid of the tank, the resistance of the closed circuit is varied, causing the pointer of a level meter to move accordingly.

2 Claims, 4 Drawing Sheets

FLUID LEVEL MEASURING DEVICE WITH ARMLESS FLOAT

BACKGROUND OF THE INVENTION

The present invention relates to a fluid level measuring device With an armless float particularly adapted for an irregularly shaped gas tank of a vehicle which is slidably mounted to an elongated mounting pole, fixed to the top of a gas tank at one end thereof and extending to the bottom of the tank at the other, and can move up due to the buoyancy of the fluid in the tank and drop down due to its own weight. A PC board is engaged with a receiving groove on the mounting pole. A float is provided with a pair of copper points, connected to each other end to end, that are in slidable abutment against the PC board. On the PC board there is disposed an elongated conductive circuit path, and a plurality of disconnected or spaced T shaped conductive units that are consecutively bridged to each other at one end thereof by a series connected resistors and are still kept open looped at the other end thereof. The two copper points one of which is in contact with the elongated conductive circuit path and the other thereof is in selective contact with one of the conductive units so as to bridge the series connected resistors and the elongated conductive circuit path into a closed loop with the grounded mounting pole. As a result of the variation of the sum of the series connected resistors with which one of the two copper points is in selective contact, depending on the fluid level of the gas tank, the indication pointer of the gauge is moved accordingly. A typical prior art fluid level measuring device with a float arm, widely adopted in the gas tank of a common vehicle, is illustrated in FIG. 1. The float arm is provided with a float 101 secured to the end of a pivotal extension arm 10 which is equipped a conductive copper point at the other end thereof. The extension arm pivotally fixed to a mounting frame is in slidable abutment against a curved detection unit 20 having a windingly placed resistor wire disposed thereon by way of the conductive copper point whereby as the float is pivotally lifted up due to buoyancy of the fluid in the tank or moves downward with the dropping of the level of the fluid due to its own weight, the conductive copper point will be in contact with the resistor line at different points accordingly, resulting in the variation of the resistance of the detection unit. Thus, a pointer of a meter under the influence of the variation of the resistance of the detection unit is able to indicate the level of the fluid in the tank accordingly.

The prior art float arm mounted to a conventional fluid level measuring device has some disadvantages in practical use that are given as below:
1. The float arm takes up relatively large space.
2. The mounting of the float arm is relatively time consuming and material wasting.
3. The indication pointer of the associated gauge is seriously fluctuated back and forth when the vehicle is travelling on a bumpy road as a result of the length of the arm amplifying the degree of the fluctuation of the fluid in the tank.
4. The addition of a float arm makes the mounting of the fluid level measuring device relatively difficult in one aspect, and the pivot arm limits the mounting of the same only in a specific position whereat the arm can pivot freely in the gas tank in another aspect.

To overcome the above cited problems, the present inventor has designed a fluid level indicating device with an armless float that is free of the above cited disadvantages.

SUMMARY OF THE INVENTION

Therefore, the primary object of the present invention is to provide a fluid level measuring device with an armless float which is easy to mount and cheap to produce; and the armless float permits the present level measuring device to be mounted freely in a gas tank without any directional restraint imposed usually on a prior art level measuring device having a float arm which requires a relative large space to pivot.

Another object of the present invention is to provide a fluid level measuring device which can measure precisely the fluid content of an irregularly shaped gas tank.

One further object of the present invention is to provide a fluid level measuring device that can be fitted into variously shaped gas tanks and the same can be modified by varying the resistors thereof so that the fluid level of the gas tank can be precisely measured.

DETAILED DESCRIPTION OF THE PREFERRED EMBODIMENT

Figure 1:
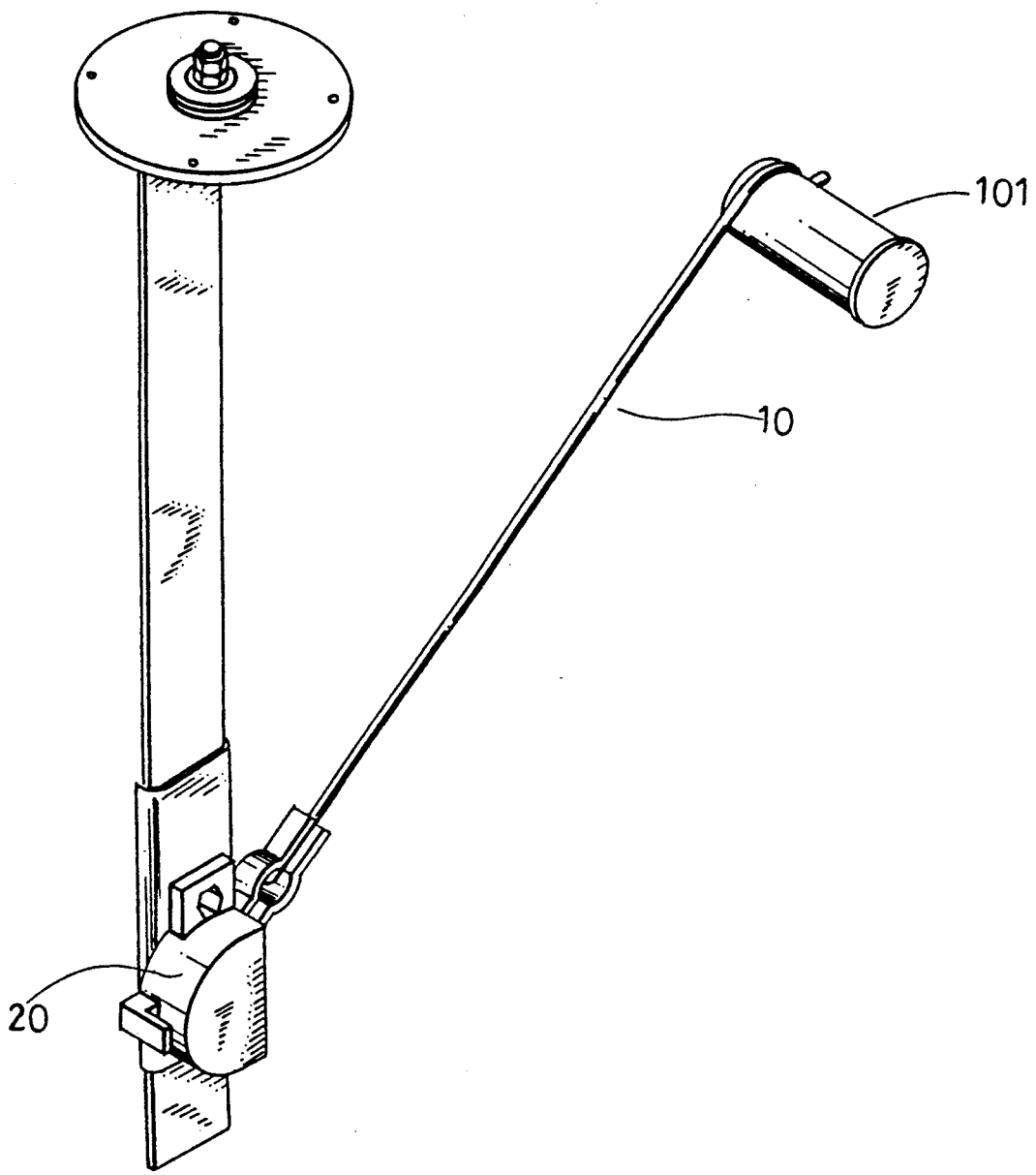
FIG. 1 is a diagram showing the prior art fluid level measuring device with a float arm.
Figure 2:
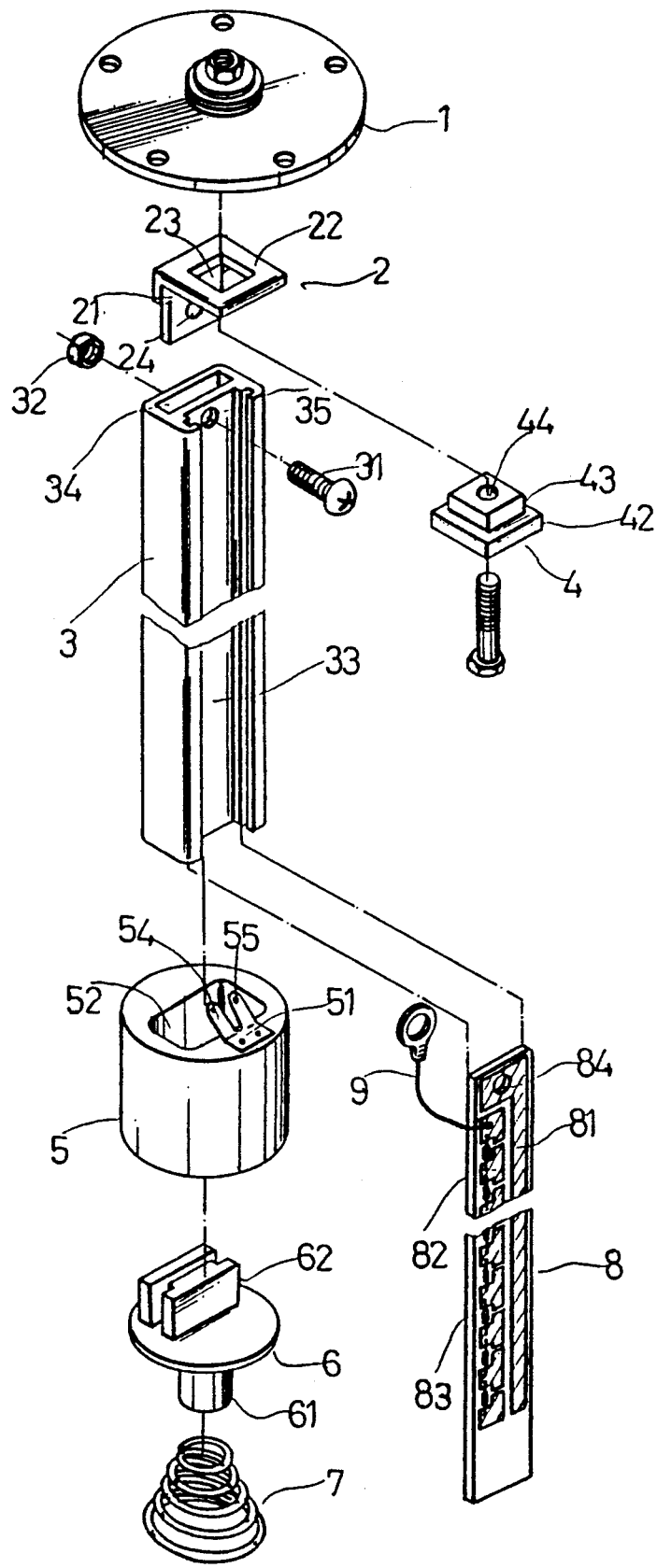
FIG. 2 is a perspective diagram showing the fluid level measuring device of the present invention.
Figure 3:
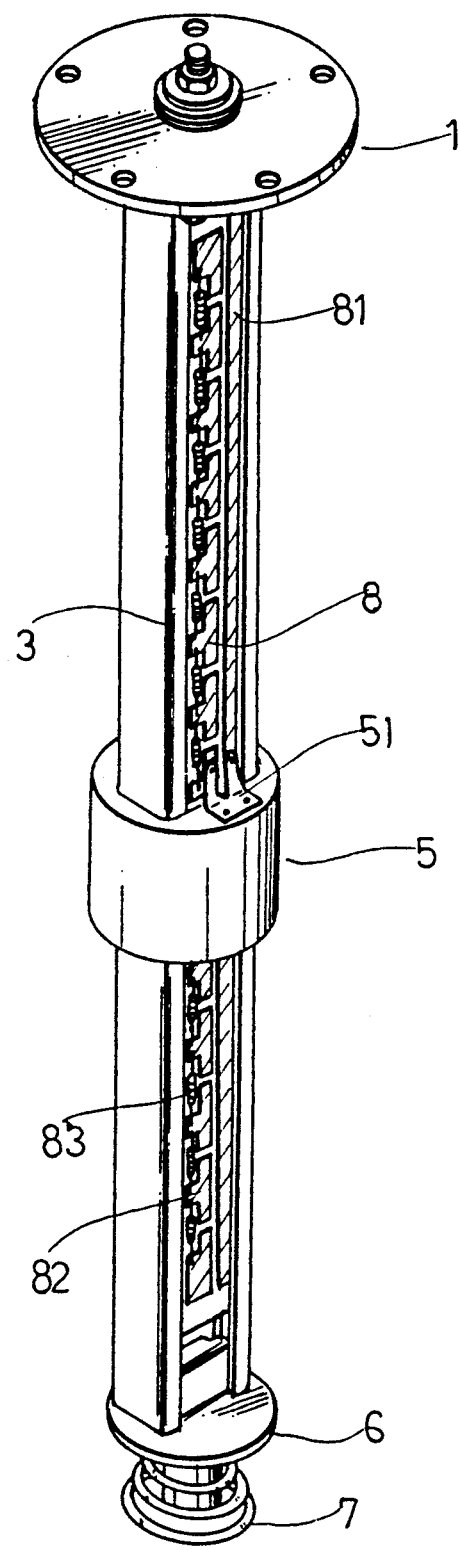
FIG. 3 is a perspective diagram showing the exploded components of the present invention.
Figure 4:
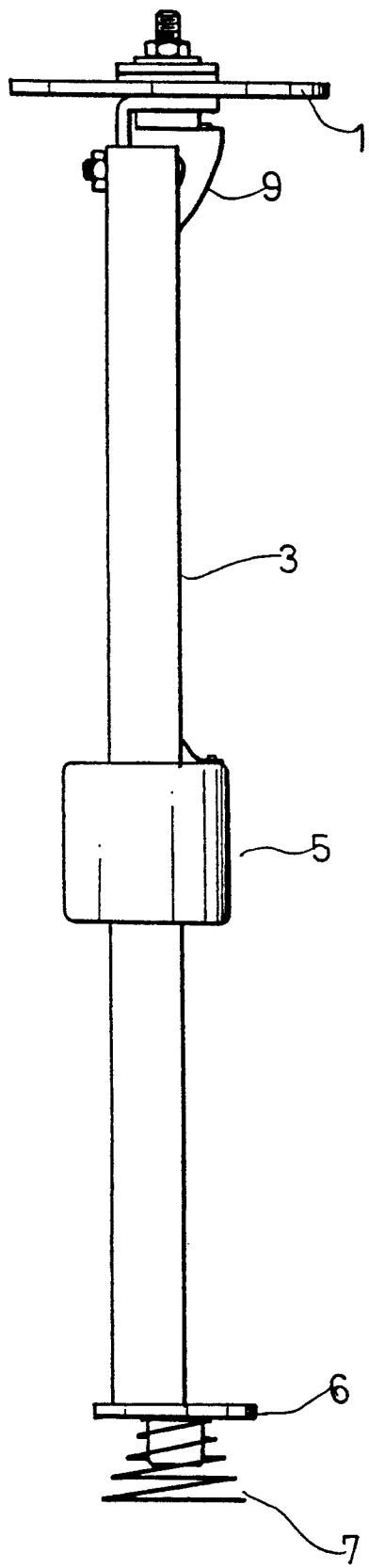
FIG. 4 is a side view of the present invention.
Figure 5:
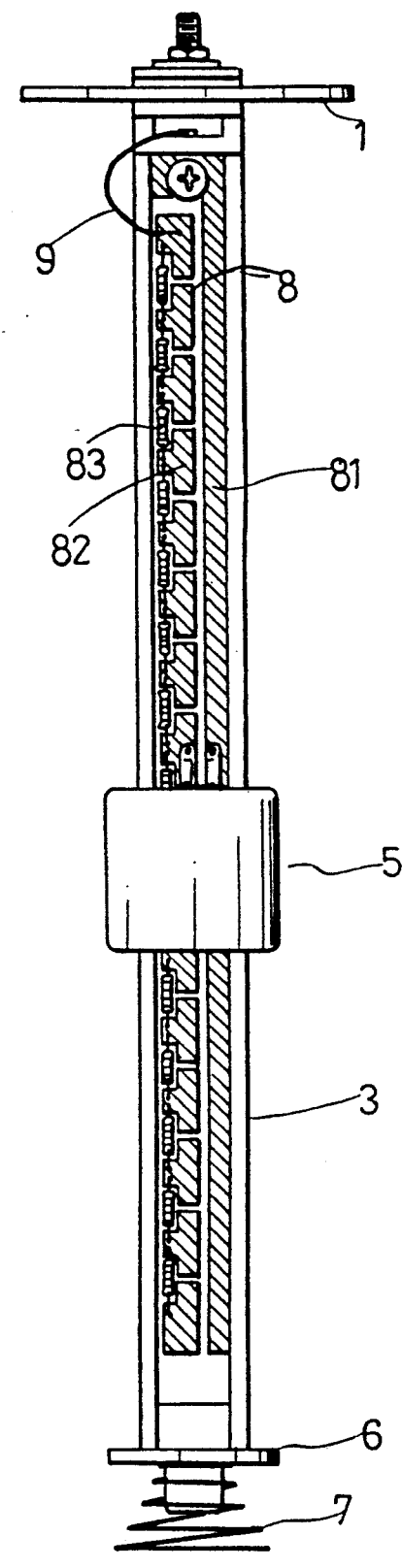
FIG. 5 is a front view of the present invention.

Referring to FIG. 2, the present fluid level measuring device is mainly comprised of a mounting pole 3, a float 5 and a PC board 8 wherein the float 5 is slidably mounted onto the mounting pole 3 and the PC board 8 is fixedly attached to the mounting pole 3 too. The mounting pole 3 long enough to extend to the bottom of a gas tank is provided with a receiving groove 33 which extends full length at the front side thereof for the attachment of the PC board 8. A screw hole 35 is disposed near the top end of the mounting pole 3 and a deep slot 34 is defined at the topmost end thereof. The float 5 which can be made in different shapes is slidably mounted onto the mounting pole 3; a through hole 52 defined in conformance to the cross section of the mounting pole 3 so as to permit the slidable attachment of the float 5 to the mounting pole 3. The float 5 is provided with a metallic contact member 51 having a pair of extended copper contact points 54, 55.

The PC board 8 disposed in the receiving groove 33 is provided with an elongated conductive circuit path 81 with a screw hole 84 disposed at the top end thereof, and also provided with a plurality of disconnected or spaced T-shaped conductive units 82 located in linear alignment with each other and in parallel with the elongated conductive circuit path 81. The spaced T-shaped conductive units 82 are series connected at one end with each other by way of resistors 83 with the other end remained open ended. A grouding wire 9 is connected to the topmost T-shaped conductive unit 82.

The float 5 slidably attached to the mounting pole 3 is in abutment association with the PC board 8 by way of the two contact copper points 54, 55 in abutment with one of the T-shaped conductive units 82 and the elongated conductive circuit path 81 respectively.

A circular fixing plate 1 secured to a gas tank is engaged with the mounting pole 3 by way of a first connection member 2 and a second connection member 4 disposed at the top end of the mounting pole 3 with a supporting element 6 removably attached to the bottom end of the pole 3. A spring 7 is disposed at the bottom of the the supporting element 6.

The first connection member 2 is made up of an integral piece of metal bent into right angle to form a vertical portion 21 and a horizontal portion 22 perpendicular to each other. A square through hole 23 is disposed at the center of the horizontal portion 22 and a screw hole 24 is defined on the center of the vertical portion 21. The vertical portion 21 is inserted into the deep slot 34 disposed at the topmost edge of the mounting pole 3 with the screw hole 24 in alignment with the screw hole 35 located at the top end of the mounting pole 3 so as to permit a screw 31 and nut 32 to fix the first connection member 2 to the mounting pole 3. The second connection member 4 is made up of two square layers with the upper layer 43 smaller than the lower layer 42 and the upper layer 43 is made in such a size that it can be fixed into the square through hole 23 of the first connection member 2, and a screw 41 is used to secure the second connection member 4 to the fixing plate 1. The supporting element 6 having a cylindrical leg 61 disposed at the bottom thereof and an engagement insert 62 disposed at the top thereof which can be engaged with the bottom of the mounting pole 3 and a spiral spring 7 is attached to the cylindrical leg 61.

It is well known in the art that a gas tank can be designed in a peculiar configuration so as to facilitate the installation thereof to a limiting space on a vehicle. Since the configuration of a gas tank can be so irregular that the positional variation of the float can not be used to precisely indicate the level of the fluid therein. The only way to effect precise measurement of the amount of the fluid is to make a calculated arrangement of the series connected resistors so as to generate proper resistance at specific points along the mounting pole 3 whereby the float 5 can be used to indicate the real content of the fluid in the gas tank by way of a pointer of a gauge which is acutated to pivot in correspondence to the value of the resistance of the resistors 83 no matter in what shape the gas tank is designed.

It becomes crystally clear now with the proceeding detailed description that the present fluid level measuring device with an armless float takes advantage of the float 5 which is slidable along the mounting pole 3 and is provided with a pair of copper points 54, 55 connected end to end. The copper points 54, 55 are in slidable contact with one of the T-shaped conductive units 82 that are series connected by the resistors 83 and the elongated conductive circuit path 81 respectively so as to bridge the open ended circuit together; and the series connected conductive units 82 are grounded by way of a grounding wire 9 which is coupled to the fixing plate 1 by way of the first and second connection members 2, 4; and the fixing plate 1 is grounded so that the float 5 can bridge the open looped circuit into a closed circuit. As a result of the positional variation of the float in correspondence to the level of the fluid in the gas tank, the sum of the resistance of the series connected resistors 83 is accordingly changed whereby the resistance of the closed circuit is altered; an indication pointer of a gauge associated with the closed circuit is actuated to move and the content of the fluid in the gas tank is pointed out by a number marked on the gauge. The present fluid level measuring device is equipped with no float arm so that the fluctuation of the float 5 will not be amplified by the arm even the vehicle is running on a bumpy road in one aspect; and the present device can be adapted for any irregularly shaped gas tank and the content of the tank can be precisely measured by way of calculated adjustment of the sum of the resistance at specific points via the arrangement of proper resistors 83 in advance.

Moreover, the armless float permits the present level measuring device to be freely and easily located in a gas tank without any positional limitation usually imposed on a conventional one which must be mounted at a specific position so as to allow an elongated float arm to be pivotal in a limited gas tank.

I claim:

1. A fluid level measuring device with armless float particularly adapted for an irregularly shaped gas tank of a vehicle, comprising:

a circular fixing plate;

a first connection member, made of an integral piece of metal bent into a right angle forming a vertical portion and a horizontal portion perpendicular to each other; said vertical portion being provided with a screw hole at the center thereof with a through hole disposed at the center of said horizontal portion;

a second connection member having two layers, an upper layer and a lower layer, said upper layer being smaller in size than said lower layer and said upper layer being in conformance in shape to said through hole of said horizontal portion of said first connection member so as to permit said second connection member to be engaged with said first connection member in assembly; a screw hole being disposed through the center of said second connection member so as to permit the same to be secured to said fixing plate;

an elongated mounting pole having a receiving groove disposed at the front side and extending the full length thereof with a screw hole disposed near the top end thereof and a deep slot being disposed at the topmost edge thereof for the insertion of said vertical portion of said first connection member with the screw hole thereof in alignment with said screw hole disposed at the top end of said mounting pole so as to permit said first connection member to be removably secured to said mounting pole by means of a screw and a nut;

a float having a through hole disposed at the center thereof and made in conformance in shape to said mounting pole so as to permit said float to be slidably attached to said mounting pole; a metallic contact member having a pair of extended copper contact points being disposed at the top of said float and adjacent to said through hole;

a PC board disposed in said receiving groove of said mounting pole having an elongated conductive circuit path and a plurality of linearly disposed disconnected T-shaped conductive units that are in parallel with said elongated conductive circuit path and are series connected at one end by means of resistors but remained open ended at the other end;

and a grounding wire being coupled to the top end of said series connected resistors and further to said fixing plate;

one of said copper contact points of said metallic contact member being in slidable abutment with said elongated conductive circuit path and the other said copper contact point being in selective abutment with one of said T-shaped conductive units so as to constantly form a closed circuit having varied resistance as said float being moved along said mounting pole as a result of the variation of the level of the fluid in the gas tank;

a supporting element having an engagement insert disposed at the top thereof and removably engaged with the bottom of said mounting pole; and a cylindrical leg disposed at the bottom thereof so as to permit a spiral spring to be attached thereto.

2. A fluid level measuring device as claimed in claim 1 wherein said series connected resistors can be replaced and calculatedly arranged in such a manner that the fluid level of any irregularly shaped gas tank can be measured in a more precise way.

* * * * *